US012659652B2

(12) United States Patent
Roemer et al.

(10) Patent No.: US 12,659,652 B2
(45) **Date of Patent: *Jun. 16, 2026**

(54) DIRECTIVITY PATTERN CONTROL WAVEGUIDE FOR A SPEAKER, AND SPEAKER INCLUDING A DIRECTIVITY PATTERN CONTROL WAVEGUIDE

(71) Applicant: Perlisten Audio LLC, Verona, WI (US)

(72) Inventors: Dan Roemer, Oregon, WI (US); Erik Wiederholtz, New Glarus, WI (US)

(73) Assignee: Perlisten Audio LLC, Verona, WI (US)

( * ) Notice: Subject to any disclaimer, the term of this patent is extended or adjusted under 35 U.S.C. 154(b) by 155 days.

This patent is subject to a terminal disclaimer.

(21) Appl. No.: 18/780,013

(22) Filed: Jul. 22, 2024

(65) Prior Publication Data

US 2024/0381024 A1 Nov. 14, 2024

Related U.S. Application Data

(63) Continuation of application No. 17/524,918, filed on Nov. 12, 2021, now Pat. No. 12,047,738.

(60) Provisional application No. 63/227,699, filed on Jul. 30, 2021.

(51) Int. Cl.
*H04R 1/40* (2006.01)

(52) U.S. Cl.
CPC .................................... *H04R 1/403* (2013.01)

(58) Field of Classification Search
None
See application file for complete search history.

(56) References Cited

U.S. PATENT DOCUMENTS

| | | | |
|---|---|---|---|
| 9,706,289 | B2 | 7/2017 | Adamson et al. |
| 9,955,260 | B2 | 4/2018 | Button |
| 10,194,238 | B2 | 1/2019 | Button et al. |
| 10,341,763 | B2 | 7/2019 | Li et al. |
| 10,531,200 | B2 | 1/2020 | Voishvillo |
| 10,785,560 | B2 | 9/2020 | Bezzola et al. |
| 10,848,863 | B2 | 11/2020 | Peace, Jr. |
| 10,862,446 | B2 | 12/2020 | Ramos |
| 11,284,194 | B2 | 3/2022 | Marti et al. |
| 11,336,976 | B2 | 5/2022 | Subat |

(Continued)

*Primary Examiner* — Duc Nguyen
*Assistant Examiner* — Assad Mohammed
(74) *Attorney, Agent, or Firm* — Boardman & Clark LLP

(57) ABSTRACT

A directivity pattern control (DPC) waveguide for a speaker is disclosed. The DPC waveguide comprises a body and first, second, and third drivers secured to the body. The body comprises a substantially planar portion having a planar surface, a waveguide portion having a waveguide surface contiguous with the flat surface, a first driver aperture at least substantially formed by the planar portion, a second driver aperture at least substantially formed by the planar portion, and a third driver aperture formed by the waveguide portion. The first driver propagates sound toward the first driver aperture, the second driver propagates sound toward the second driver aperture, and the third driver propagates sound toward the third driver aperture. The third driver is in a plane along an axis different than a plane for the first driver and the second driver. Also disclosed is a speaker including the DPC waveguide.

17 Claims, 11 Drawing Sheets

(56) References Cited

U.S. PATENT DOCUMENTS

| | | | | |
|---|---|---|---|---|
| 11,336,992 | B2 | 5/2022 | Peace et al. | |
| 11,490,194 | B1 | 11/2022 | Voishvillo et al. | |
| 11,564,032 | B2 | 1/2023 | Garcia et al. | |
| 11,985,459 | B2 | 5/2024 | Nguyen et al. | |
| 12,047,738 | B1 | 7/2024 | Roemer et al. | |
| 2016/0073195 | A1* | 3/2016 | Adamson | H04R 1/26<br>381/338 |
| 2017/0325019 | A1* | 11/2017 | Bezzola | H04R 1/345 |
| 2019/0305743 | A1 | 10/2019 | Ramos | |
| 2022/0264205 | A1 | 8/2022 | Nguyen et al. | |
| 2022/0353607 | A1* | 11/2022 | Garcia | H04R 1/345 |

* cited by examiner

2kHz Single Beryllium TW

2kHz DPC Technology

DIRECTIVITY PATTERN CONTROL WAVEGUIDE FOR A SPEAKER, AND SPEAKER INCLUDING A DIRECTIVITY PATTERN CONTROL WAVEGUIDE

RELATED APPLICATION

This application is a continuation of U.S. patent application Ser. No. 17/524,918, filed Nov. 12, 2021, entitled "DIRECTIVITY PATTERN CONTROL WAVEGUIDE FOR A SPEAKER, AND SPEAKER INCLUDING A DIRECTIVITY PATTERN CONTROL WAVEGUIDE", to be issued as U.S. Pat. No. 12,047,738, on Jul. 23, 2024; which claims the benefit of U.S. Patent Application No. 63/227,699; field on Jul. 30, 2021; entitled "DIRECTIVITY PATTERN CONTROL WAVEGUIDE WITH INTEGRATED BEAMFORMING DRIVERS"; the contents of both of which are incorporated herein by reference.

BACKGROUND

The disclosure relates to loudspeakers, and more particularly, in some constructions, the disclosure relates to speakers that may be used in a home entertainment system.

Typical speaker systems for a home entertainment system include multiple drivers for extended bandwidth. For systems that include two or more speaker drivers of different diameters, it is advantageous to be able to control the directivity of the speaker system, especially at mid-to-high frequencies, in either the horizontal or vertical axis in the listening environment.

Current technology typically provides less than desirable directivity in the vertical and horizontal axes. Current technologies utilize a single driver, typically a tweeter, with a waveguide or horn having a specific shape in the vertical and horizontal directions to control the vertical and horizontal polar patterns. This technique can have a specific horn shape to tune the directivity of radiation compared to the designer's frequency response targets. However, these existing designs are also limited in the maximum sound pressure level (SPL), and the amount of directivity control cannot be altered after the waveguide is designed.

Accordingly, a need exists for a different alternative.

SUMMARY

In embodiments, the invention provides control of the vertical and horizontal directivity with a waveguide and adds multiple beamforming drivers for additional power and to manipulate directivity. The invention further can include a passive crossover to make a more powerful tool to further solve directivity without complicated crossover networks. The invention can be applied to application specific speakers where different directivity may be beneficial for each use case that can be adjusted for each individual design.

In additional or alternative embodiments, the invention combines a waveguide with a multi-driver (e.g., three drivers) array. The waveguide can be used to help design the vertical and horizontal directivities using the physical shape for the waveguide and time of each driver through the physical placement (e.g., distance) of the drivers. The multi-driver array can be arranged in a vertical placement and allow for horizontal and vertical directivities to be adjusted as needed to maximize the design with passive crossover design changing the amplitude and phase into each driver. Prior designs don't incorporate both technologies to create the advantages of both the waveguide and the array.

Embodiments of the speaker include, either alone or combined, one of more of the following:

waveguide control of vertical and horizontal directivity by physical waveguide shape;

waveguide power handling by increase of sensitivity from waveguide design;

waveguide time alignment by physical offset of multiple drivers for beamforming;

multi-driver (e.g., three) vertical array to allow beamforming or lobing of the multi-driver array in the vertical direction;

multi-driver array that allows the vertical energy from the array to be controllable by the designer by changing the passive crossover, phase, and amplitude;

beamforming sensitivity by increasing the sensitivity from the multi-driver array working in unison;

power handling improvement by combining technologies (e.g., the waveguide and the multi-driver array);

distortion reduction from high system sensitivity and low speaker excursion compared to typical single driver waveguide designs; and reduced compression due to increased sensitivity (i.e., each driver can handle less power and thus less heat is generated, thereby reducing compression).

In one embodiment, a directivity pattern control (DPC) waveguide for a speaker is disclosed. The DPC waveguide comprises a body having an axis, a first driver secured to the body, a second driver secured to the body, and a third driver secured to the body. The body comprises a substantially planar portion having a planar surface, a waveguide portion having a waveguide surface contiguous with the planar surface, a first driver aperture at least substantially formed by the planar portion, a second driver aperture at least substantially formed by the planar portion, and a third driver aperture formed by the waveguide portion. The first driver secured is substantially adjacent to the first driver aperture. The first driver propagates sound toward the first driver aperture. The second driver is secured to the body and substantially adjacent to the first driver aperture. The second driver propagates sound toward the second driver aperture. The third driver is secured to the body and substantially adjacent to the third driver aperture. The third driver propagates sound toward the third driver aperture. The third driver is in a plane along the axis different than a plane for the first driver and the second driver. Also disclosed is a speaker including the DPC waveguide.

Further understanding of one or more aspects of the invention can be understood by the specification herein.

BRIEF DESCRIPTION OF DRAWINGS

Various examples of embodiments of the systems, devices, and methods according to this invention will be described in detail, with reference to the following figures.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 3:
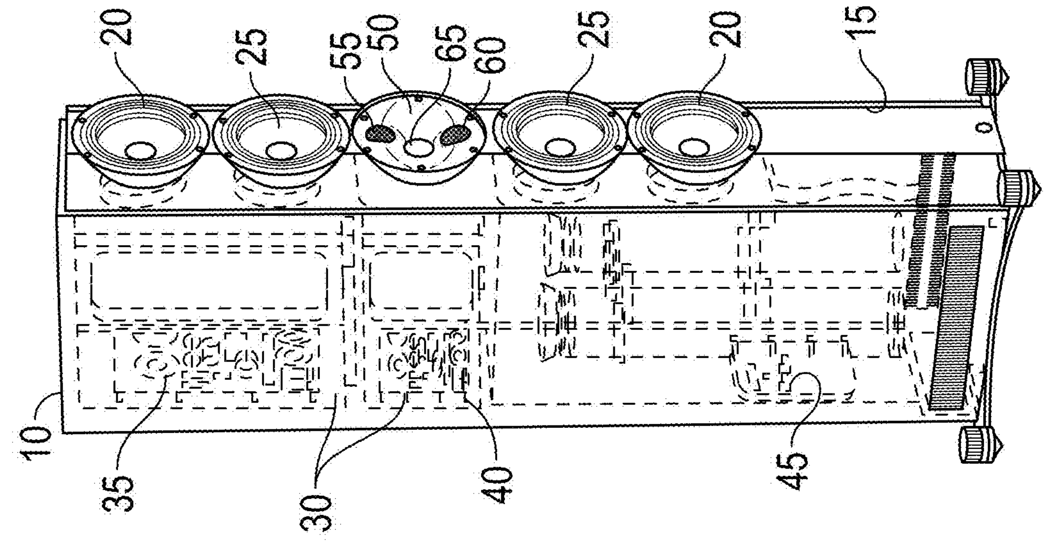
FIG. 3 is a perspective, exposed view of the speaker of FIG. 1.
Figure 2:
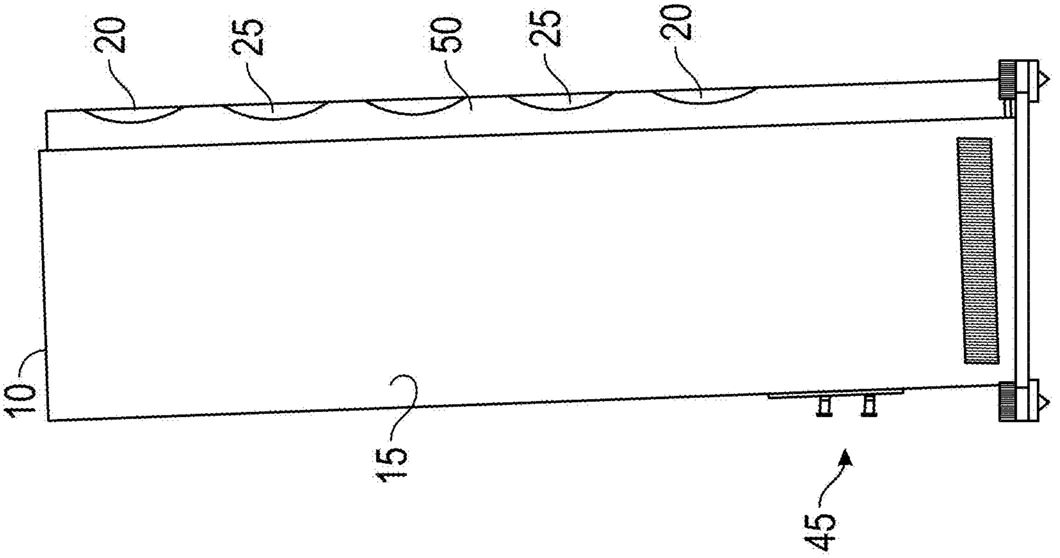
FIG. 2 is a side view of the speaker of FIG. 1.
Figure 1:
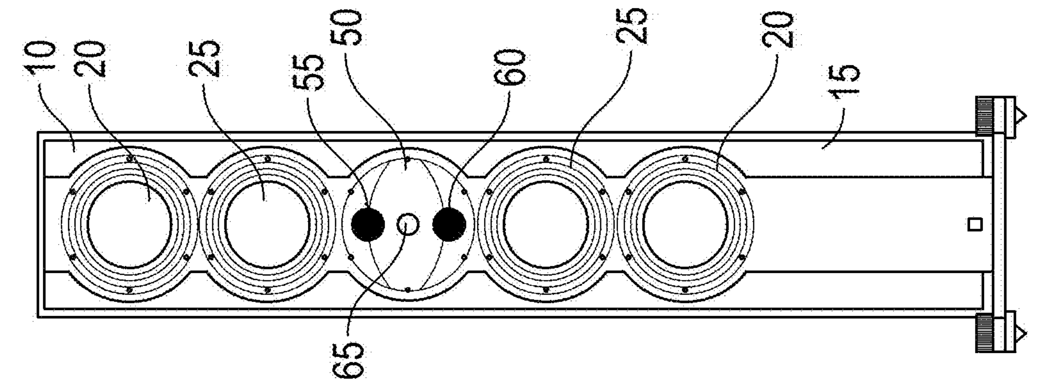
FIG. 1 is a front view of a speaker.

A loudspeaker (also simply referred to as a "speaker") 10 is shown in FIGS. 1-3. The speaker includes a housing (also referred to as an "enclosure" or "chassis") 15 and a plurality of drivers (or transducers) for creating soundwaves in response to electrical signals. Two conventional driver types are shown in FIG. 3. The number and types of drivers in a housing can vary. Moreover, the design of the conventional drivers (e.g., subwoofers, woofers 20, mid-woofers 25, mid-tweeters, tweeters, etc.) can vary as is known in the art.

Also included in the housing 15 is circuitry, which includes a speaker crossover circuit (also referred to as the "speaker crossover") 30. The speaker crossover 30 receives an audio signal and is divided according to one or more predefined thresholds. The speaker crossover 30 supplies each driver with the signal range it was designed to best reproduce. For example, the speaker crossover 30 ensures that each conventional driver (e.g., the woofer(s) 20 and the mid-woofer(s) 25) only receives the frequencies it was designed to reproduce. The speaker crossover 30 can further delineate the output signals with varying amplitudes and phases. The speaker crossover 30 may be implemented via hardware, via software (stored in memory and executed by a processor), or a combination of hardware and software, and may be referred to as passive or active. For the embodiment shown in FIG. 3, the speaker crossover 30 is implemented by hardware and is passive. The speaker crossover 30 includes main speaker crossover 35 that provides sets of frequency ranges, amplitudes, and/or phases to the conventional drivers 20 and 25 and a frequency range, amplitude, and/or phase to the subcircuit identified as second speaker crossover 40 (discussed further below). While the second speaker crossover 40 in FIG. 3 is shown as being distinct from the main speaker crossover 35, the subcircuit 40 can be part of the circuit 35. The speaker crossover 30 receives the signal from a source via the terminals 45.

The speaker of FIGS. 1-3 further includes what is referred to herein as a directivity pattern control (DPC) waveguide 50. The DPC waveguide 50 combines the technology of a waveguide with multiple drivers for a beamforming array. The multiple drivers shown in FIGS. 1 and 3 are tweeters. Two of the drivers (or mid-tweeters) 55 and 60 are used for midrange frequencies and are substantially flush with the front of the baffle. The third driver (or tweeter) 65 is at the center of the waveguide and is a full-range frequency tweeter. An example frequency range for the full-range tweeter is 1 kHZ vs. 20 Hz. The size of the drivers 55-65 can vary and range from, for example, from a diameter of 13 mm to 50 mm, with a more defined range of 22 mm to 32 mm, with example diameters including 26 mm and 28 mm. In the construction shown, the drivers 55-65 have the same diameter, although it is envisioned that the diameters of the three drivers 55-65 can vary. Preferably, the drivers 55 and 60 are the same diameter. Also in the shown construction, the three drivers 55-65 are in a vertical array, although it is envisioned that other placements for the three drivers 55-65 are possible (e.g., in a horizontal array or diagonal array). Further, it is envisioned that a different number of drivers can be used (e.g., five drivers), allowing for wider bandwidth control vertically or some other dispersion pattern. For example, five transducers arranged in a cross pattern can allow for additional control vertically over the three-driver pattern shown in FIGS. 1-3. It is also envisioned that the DPC waveguide 50 can act as a transducer to be used with the drivers 20 and 25 for different dispersion control.

Figure 4C:
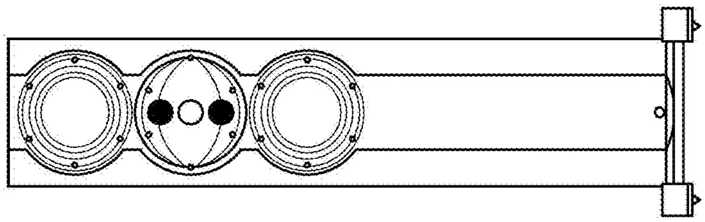
FIGS. 4A-4E are front views of speakers.
Figure 4E:
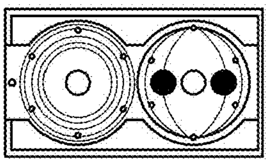
Figure 4B:
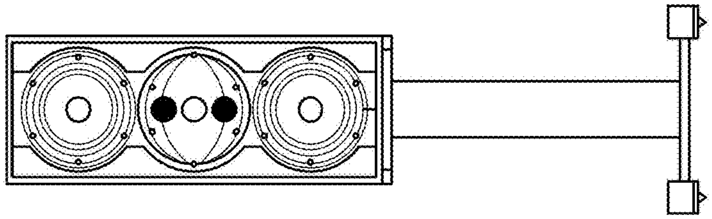
Figure 4D:
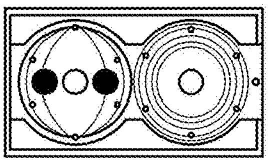
Figure 4A:
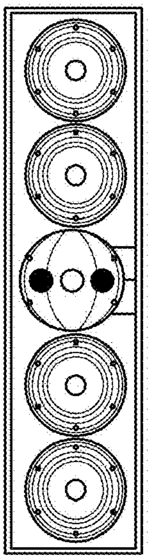
Figure 5:
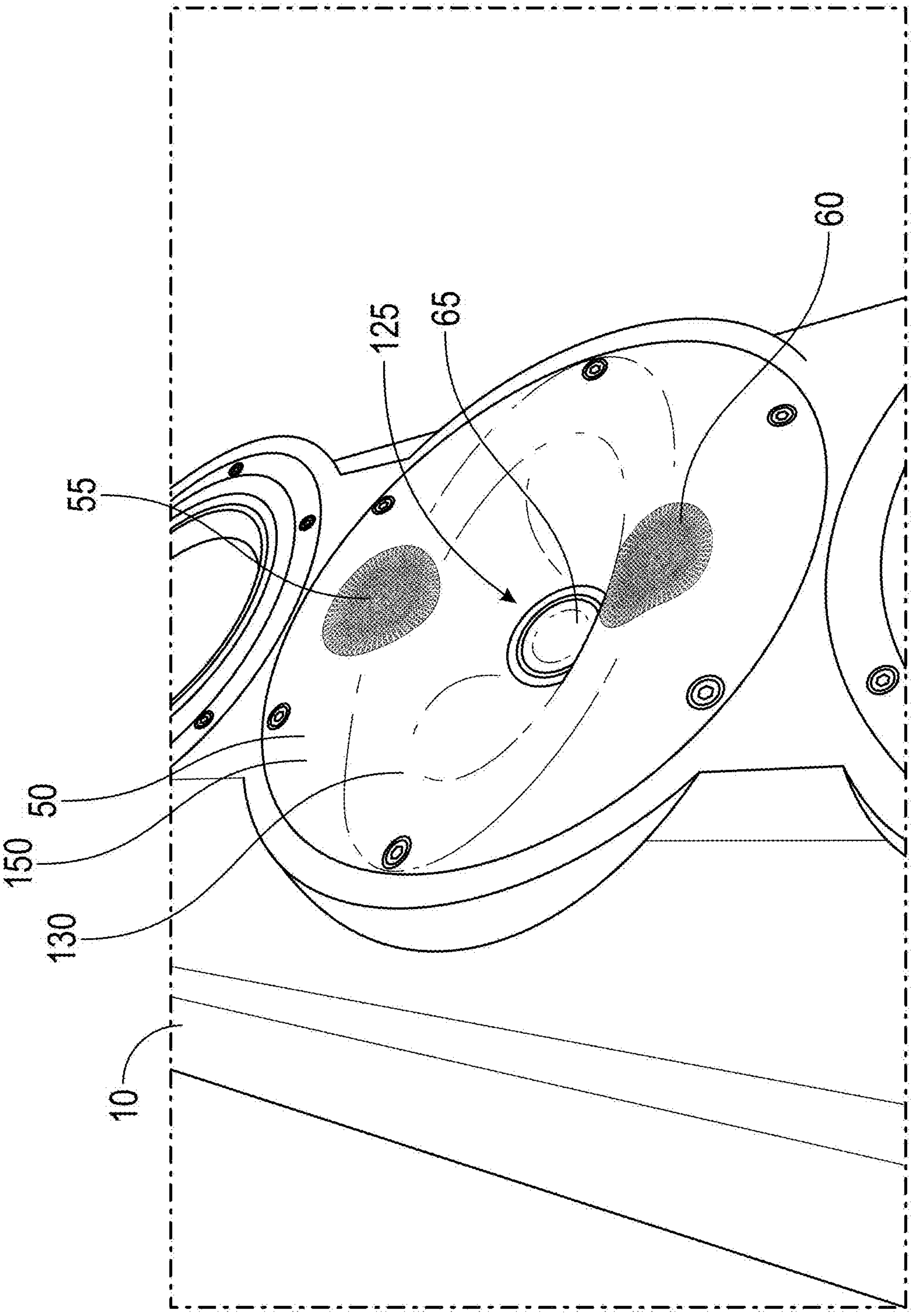
FIG. 5 is an enlarged, partial perspective view of the speaker of FIG. 1.

FIGS. 1-3 show the speaker 10 having two woofers 20, two mid-woofers 25, and the DPC waveguide 50. The speaker 10 is shown with, in a vertical arrangement, a woofer 20 and a mid-woofer 25 above the DPC waveguide 50, and a woofer 20 and a mid-woofer 25 below the DPC waveguide 50. The speaker 10 shown in FIGS. 1-3 is typically referred to as a tower speaker. However, other speakers including the DPC waveguide 50 are shown in FIGS. 4A-4E. The speakers in FIGS. 4A-4E vary in the number and arrangement of woofers and midrange drivers. FIG. 4A shows a center speaker having two woofers, two mid-woofers, and the DPC waveguide 50. FIG. 4B shows a monitor speaker having two mid-woofers on each side of a DPC waveguide. FIG. 4C shows a tower speaker having one mid-woofer on each side of a DPC waveguide. The monitor speaker also has a woofer (not shown). FIG. 4D shows a bookshelf/surround/height speaker having one mid-woofer and a DPC waveguide. FIG. 4E shows a surround/height/LCR speaker having one mid-woofer and a DPC waveguide. The location of the mid-woofer versus the DPC waveguide in FIGS. 4D and 4E can vary depending on the desired effect. Other arrangements are contemplated from the examples shown. Also, it should be noted that speaker covers are shown covering the woofers and mid-woofers in FIGS. 1 and 4C, while no speaker covers are covering the woofers and mid-woofers in FIGS. 3, 4A, 4B, 4D, and 4E.

FIGS. 5-11 show various views of the DPC waveguide 50. The DPC waveguide 50 includes a body 70 (FIGS. 8 and 9), a center tweeter 65, two side tweeters 55 and 60, and two tweeter covers (or simply "covers") 75 and 80. The construction shown for the body 70 is a discoid body or disk. However, other shapes for the body 70 are envisioned, the collection of which, including the discoid body, can be referred to as a plate-like body.

Figure 7:
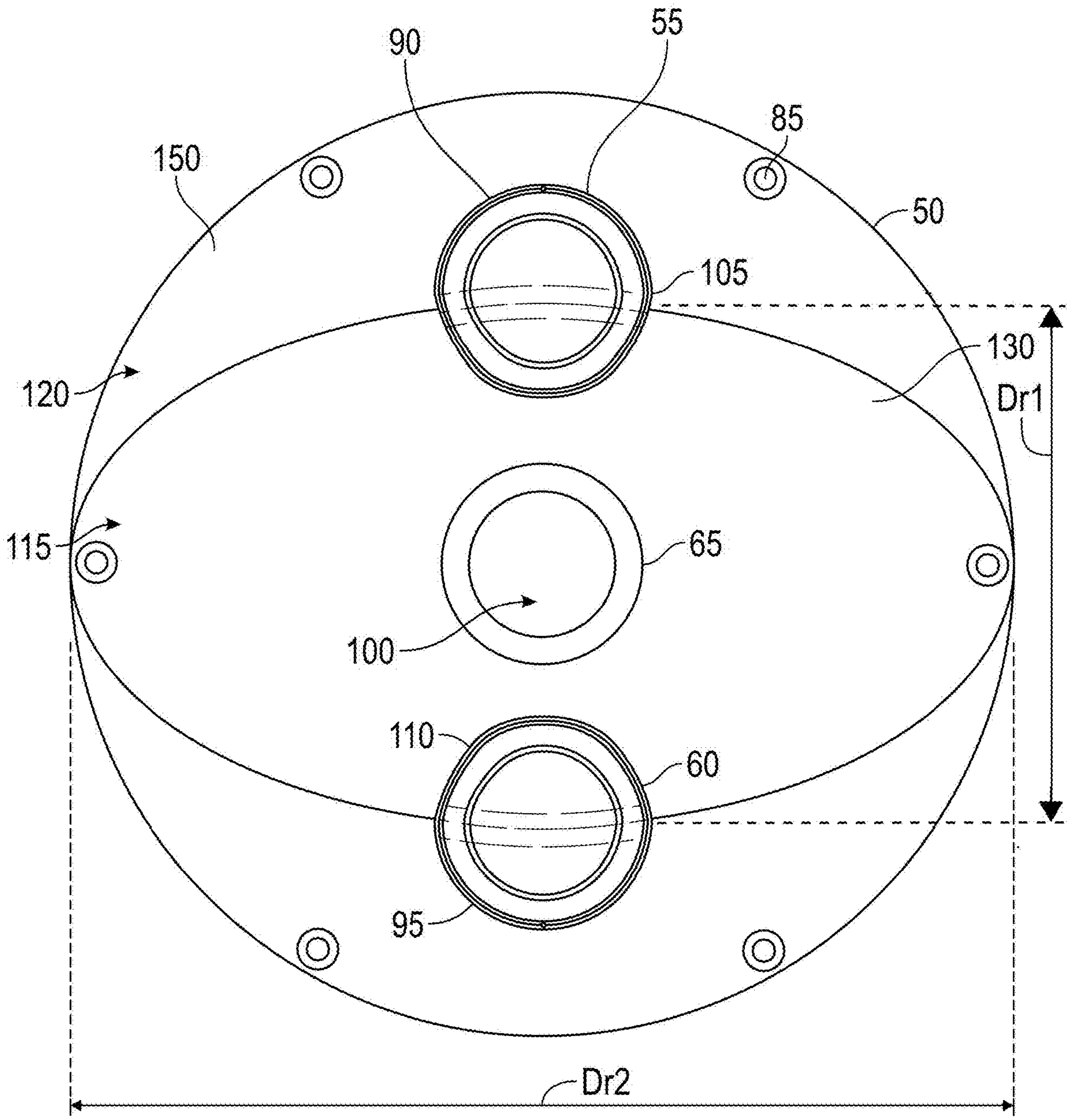
FIG. 7 is a front view of the DPC waveguide of FIG. 6 with two tweeter covers removed.
Figure 10:
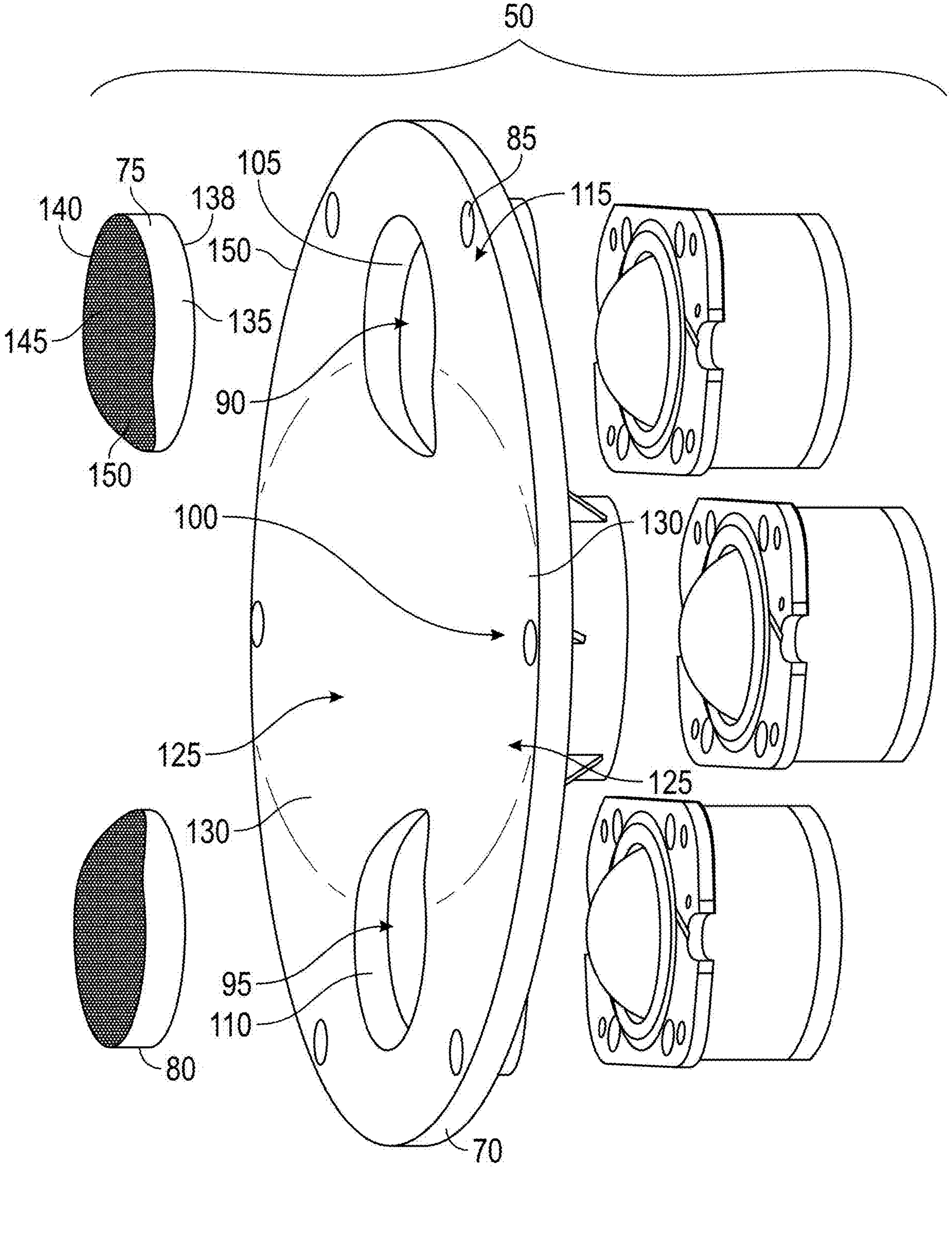
FIG. 10 is a perspective, partial exploded view of the DPC waveguide of FIG. 6.

The body 70 includes or defines a plurality of fastening apertures (aperture 85 is labelled) to receive fasteners (e.g., screws) to couple the DPC waveguide 50 to the housing 15 or for attaching the tweeters 55-65 to the body 70. The body 70 further includes or defines three tweeter apertures 90, 95, and 100 (FIGS. 7 and 10). The exterior tweeter apertures 90 and 95 receive tweeter domes of the exterior tweeters 55 and 60, respectively. The exterior apertures 90 and 95 also receive the top and bottom tweeter grills (also referred to as a "covers") 75 and 80, respectively. The exterior tweeter apertures 90 and 95 include respective shelves 105 and 110 (FIGS. 7 and 10) for the tweeter grills 75 and 80, respectively, to be placed against. The center tweeter aperture 100 receives the tweeter dome of the center tweeter 65.

Figure 6:
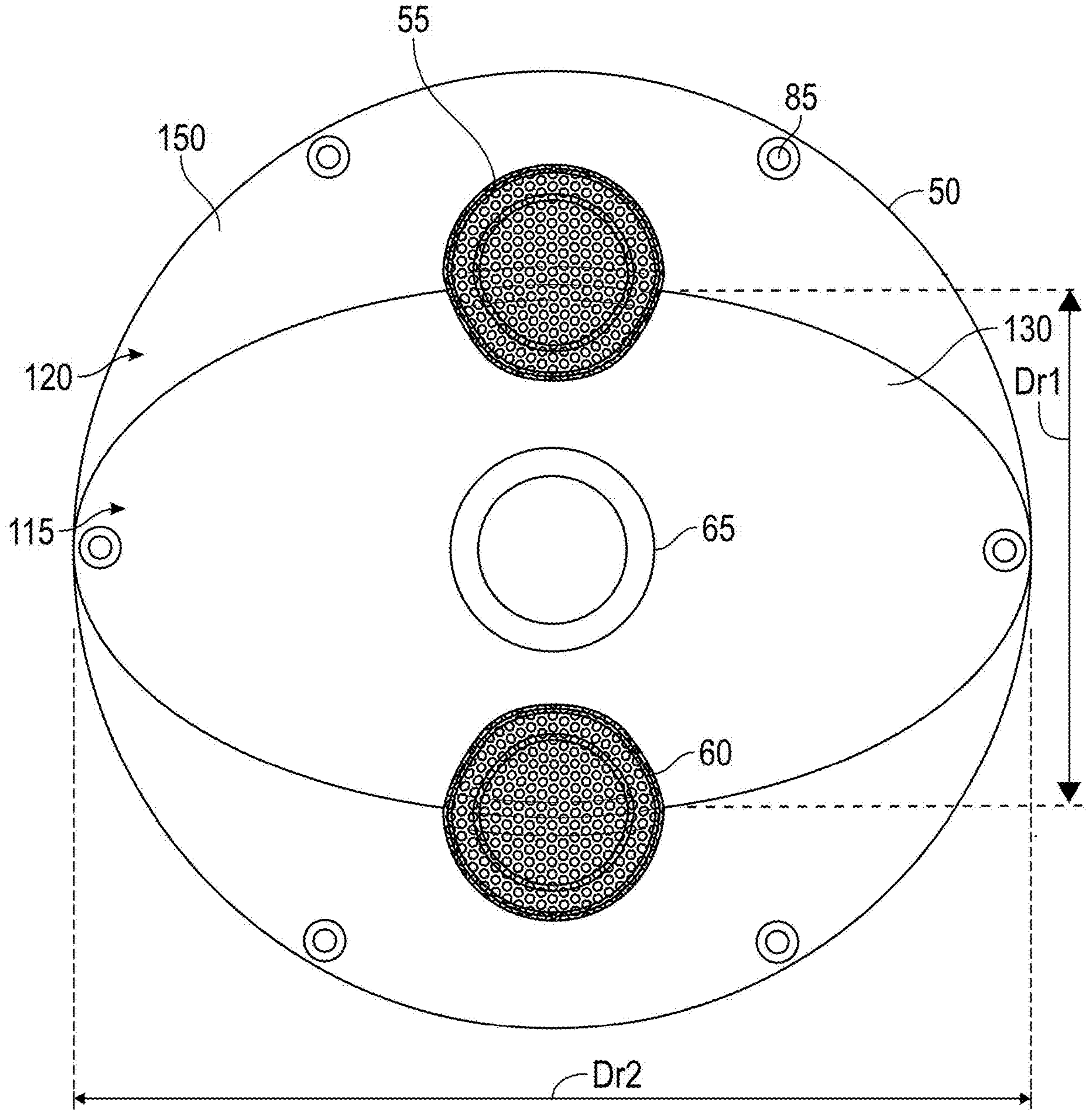
FIG. 6 is a front view of a directivity pattern control (DPC) waveguide for the speaker of FIG. 1.
Figure 8:
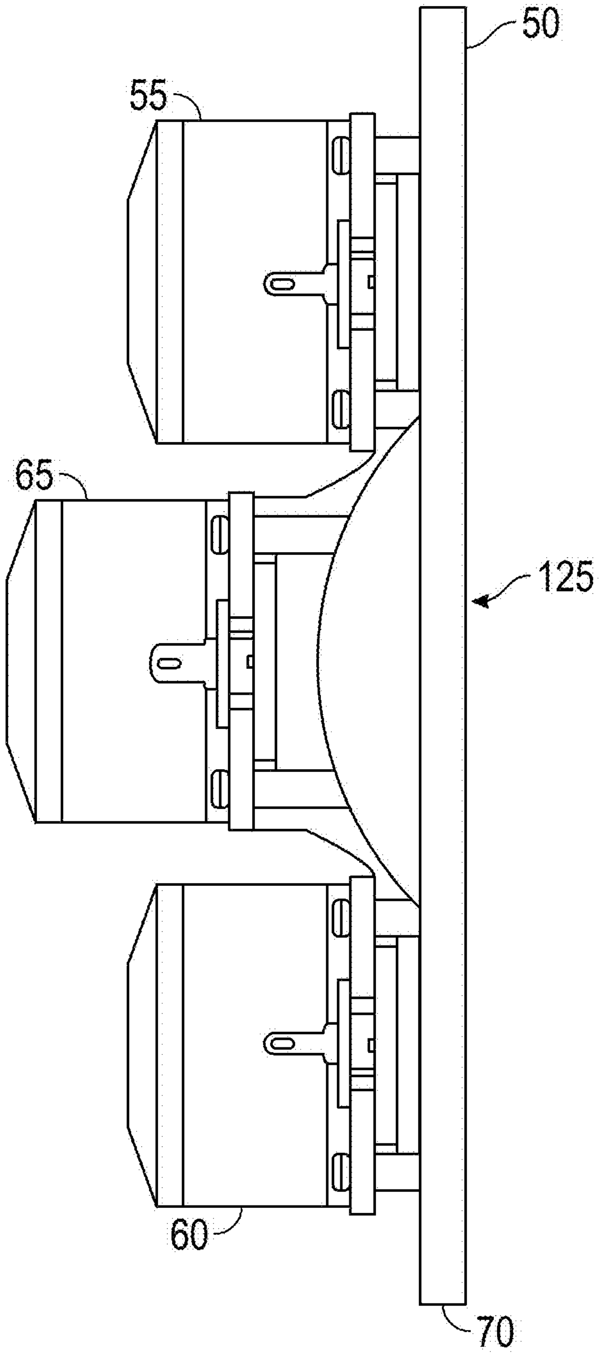
FIG. 8 is a side view of the DPC waveguide of FIG. 6.

In the shown construction, the body 70 is a substantially rigid body that can be made of plastic, wood, metal (e.g., steel, aluminum) or similar materials, and includes two portions, a waveguide portion 115 and a flat portion 120 (FIGS. 7, 8 and 10). However, it is envisioned that the waveguide portion 115 can be made of a first material different from a second material for the flat portion 120. For example, waveguide portion 115 can be made of a soft diaphragm material while the flat portion can be made of a substantially rigid material. The waveguide portion 115 includes a loudspeaker waveguide (or simply "waveguide") 125 (FIGS. 8 and 10) for the center tweeter 65 at the center of the waveguide 125. The waveguide 125 has a contoured or horn shape with a smaller diameter Dr1 in a first direction than a diameter Dr2 in the second direction (FIGS. 6 and 7). The two diameters Dr1 and Dr2 result in one end of the horn shape being oval. The difference in diameters Dr1 and Dr2 creates a shape to focus sound energy. The diameters Dr1 and Dr2 are measured from where the body 70 starts contouring into the waveguide portion 115. It is envisioned that other horn shapes are possible.

The orientation of the waveguide 125 and the horn shape of the waveguide 125 helps with the directivity/dispersion of the soundwave propagating from the waveguide 125. Shown in the construction of the drawings, the vertical diameter Dr1 of the waveguide 125 is less than the horizontal diameter Dr2 of the waveguide 125, allowing sound to disperse more in the horizontal direction than in the vertical direction. The waveguide 125 includes a horn (or contoured) surface 130 (FIGS. 6, 7, and 10). The contour of the horn surface 130 can vary (e.g., spherical, exponential) depending on the desired effect of the waveguide 125.

Figure 9:
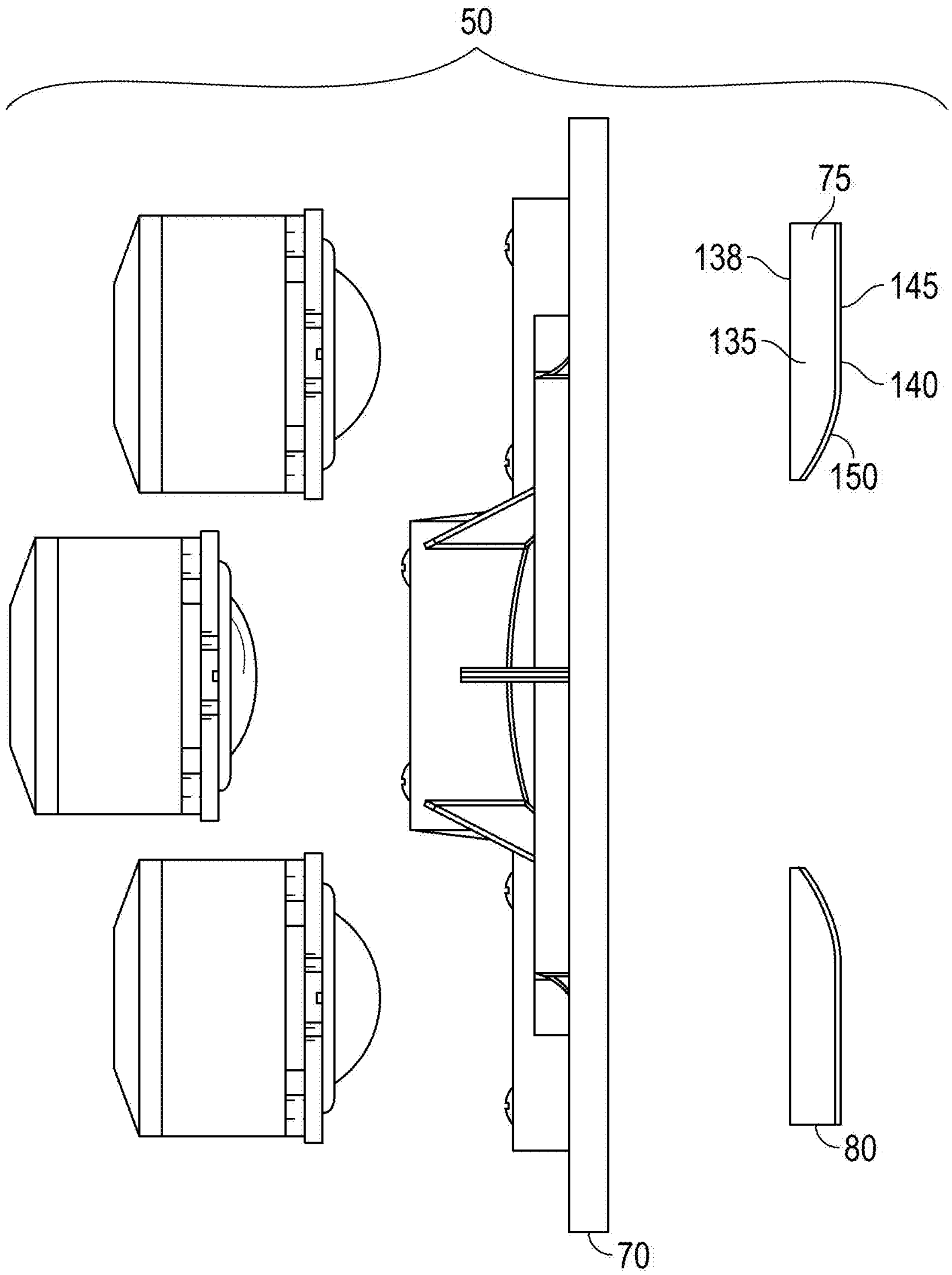
FIG. 9 is a side, partial exploded view of the DPC waveguide of FIG. 6.

The tweeter grills 75 and 80 are also substantially rigid and are typically made of a metal material, such as steel or aluminum. Using tweeter grill 75 as a representative cover, the grill 75 has an exterior wall 135 (FIGS. 9 and 10) that is shaped to align and be inserted in the aperture 90. The edge 138 of the wall 135 is disposed next to the shelf 105 and has the same thickness as the shelf 105. The length of the exterior wall 135 varies depending on the location of the wall 135 with either the flat portion 120 of the body 70 or the waveguide portion 125 of the body 70. The tweeter grill 75 further has a top 140. The top 140 has a plurality of apertures for the sound to travel through. The top 140 also includes a flat portion 145 that is flush with the flat surface 150 of the flat portion 120 and a contoured portion 155 that is contoured to the horn surface 130. As best seen in FIGS. 9 and 10, the wall 135 has a variable height to allow the top 140 to conform to the flat and horn surfaces 150 and 130, respectively.

The center tweeter 65 at the center of the waveguide 125 is a consideration of the DPC waveguide 50. Similar to other waveguides, the waveguide 125 is designed to control directivity to best meet the goals of the speaker 10. The goals (such as on axis-frequency response, the listening window 5-15 degrees off axis, early reflections response, and the power response to name a few) should be kept in balance to create a high-end speaker. The waveguide 125 can be designed to offer a wide horizontal polar pattern to create solid imaging in more seating positions. The vertical diameter can be designed to control the amount of energy in the positive/negative vertical direction to limit early reflections from the ceiling and floor which can smear important vocals. Speaker designers can tweak the waveguide 125 to meet their design goals and account for tradeoffs.

The inclusion of the multi-driver (e.g., three) beamforming array takes the DPC waveguide 50 to another level of control to help reduce tradeoffs. Traditional beamforming is achieved with three or more drivers with time, amplitude, and phase being controlled with digital signal processing (DSP) to enable the ability to control the array. With these tools, the designer can change the direction of the output along the length of the array. For example, to direct the sound from directly at the listener at 0 degrees to +15 degrees for the second row of a home theater, just change the setting in the DSP. But no control along the horizontal width of the array is possible no matter how much DSP a designer throws at the problem and not all designs have electronics and DSP at their disposal. The DPC waveguide 50 melds a wide dispersion horizontal wave guide and a vertical three speaker beamforming array to create a wider polar pattern possible than with only prior waveguides, and a controllable vertical beamforming array that is not limited to the design of the waveguide on its own.

Figure 11:
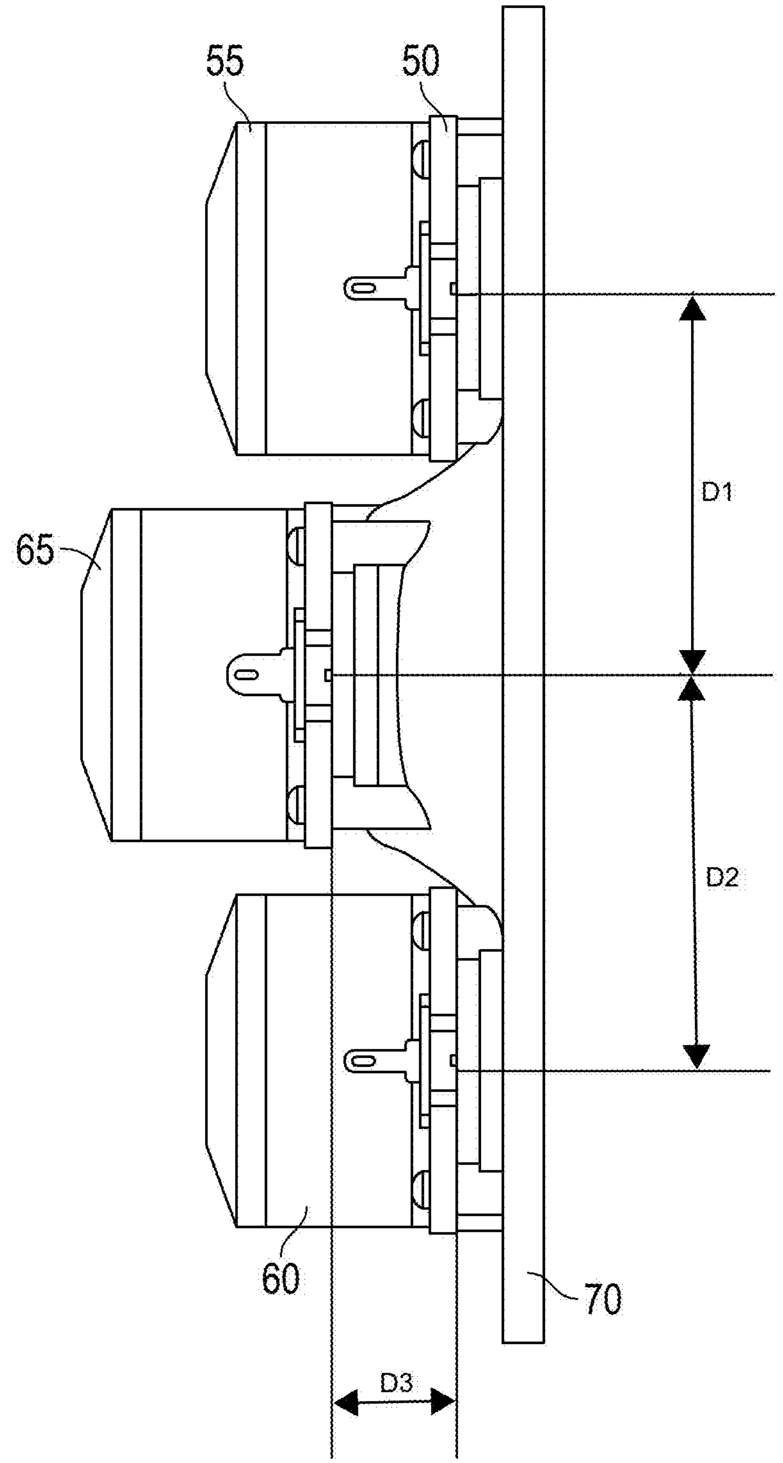
FIG. 11 is the side view of FIG. 6 with distances D1, D2, and D3 superimposed on the drawing.
Figure 12:
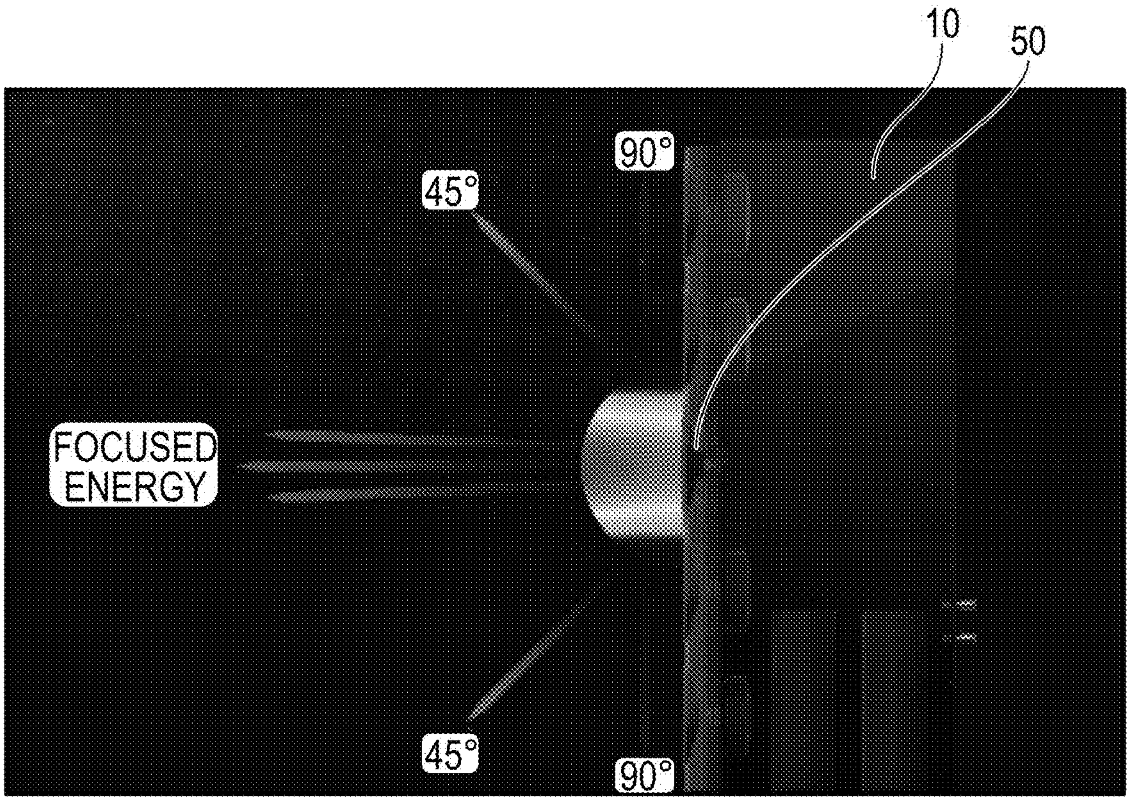
FIG. 12 is a side view of a portion of the speaker of FIG. 1 with a pattern representing a controlled vertical dispersion for the DPC waveguide of FIG. 6.
Figure 13:
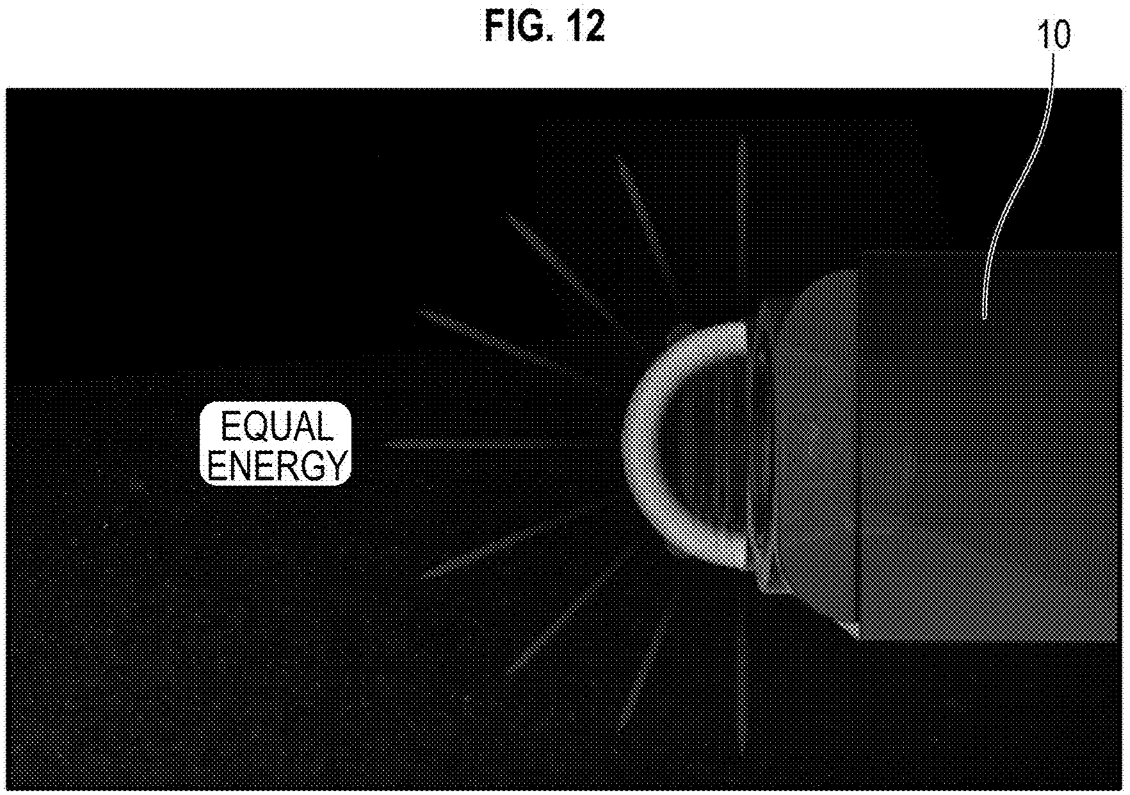
FIG. 13 is a top-down view of the speaker of FIG. 1 with the pattern representing a controlled horizontal dispersion for the DPC waveguide of FIG. 6.

With reference to FIG. 11, the drivers (e.g., tweeters) 55-65 are placed in the waveguide aligned in the vertical direction but with designed spacing (D1 and D2) and depth (D3) to control the time of arrival to the listener. The spacing D1 and D2 and depth D3 allow the control of time via physical distance offset in the waveguide 125, and the amplitude and phase can be controlled by crossover design for the drivers 55-65. FIG. 12 is a side view of the DPC waveguide 50. The figure shows a representation of a controlled energy pattern in the vertical direction for the DPC waveguide 50. Most of the vertical energy is focused along the center propagation axis from the DPC waveguide 50. FIG. 13 is a top-down view of the DPC waveguide 50. The figure shows a representation of an energy pattern in the horizontal direction for the DPC waveguide 50. Unlike FIG. 12, the energy pattern in the horizontal direction for the DPC waveguide 50 is equally dispersed. The DPC waveguide could be controlled from 900 Hz to 20 kHz, for example, and limits the early reflections from the floor and ceiling that can smear the vocal region. A prior design would transition from the woofers to a 130 mm driver with 4-5 grams of mass, as compared to 28 mm midranges for the DPC waveguide 50 with less than 1.2 gram of mass of traditional four-way designs. Vocals for the DPC waveguide 50 are smoother, and the DPC waveguide 50 create fast transients and can maintain high output levels required for massive dynamic range. The result is imaging that is wider than the room, near imperceivable distortion, and effortless dynamics. The distances D1 and D2 between the drivers 55-65 in the vertical direction can be used to help determine the highest frequencies that can beamformed. The distances D1 and D2 can be determined in part by calculating the wavelength of the frequencies per distance of the drivers for the summation of constructive and destructive interference in the sound field at the target listening position. The combination of the distance offset D3 compared to the plane for distances D1 and D2 adjusts the time of arrival for a soundwave, i.e., distance D3 introduces time delay with the center tweeter in the waveguide. The distance D3 helps determine the time alignment and performance of the sound field.

Figure 14A:
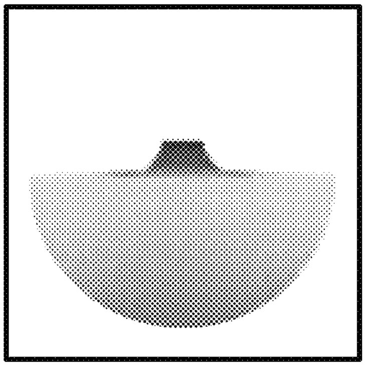
FIGS. 14A, 14B, and 14C are side, front, and front-sectional views of an energy pattern of a single tweeter.
Figure 14B:
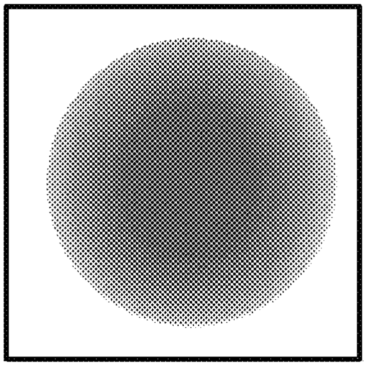
Figure 14C:
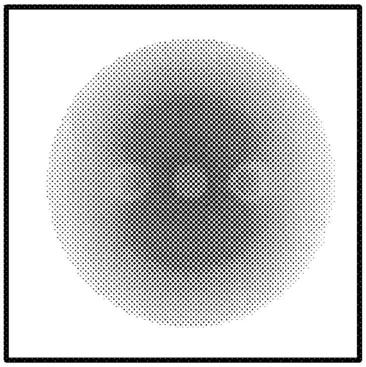
Figure 15A:
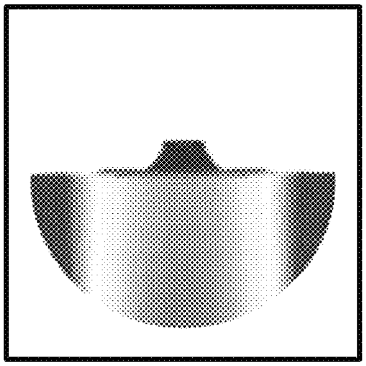
FIGS. 15A, 15B, and 15C are side, front, and front-sectional views of an energy pattern for the DPC waveguide of FIG. 6.
Figure 15B:
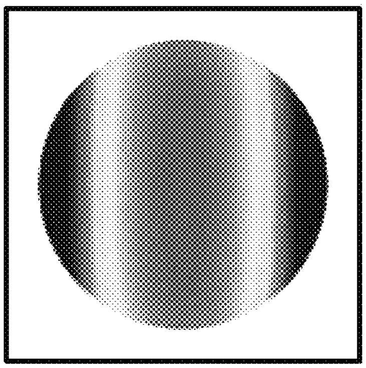
Figure 15C:
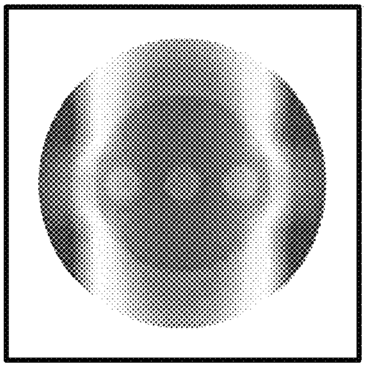

The drivers 55-65 also enable a sound designer to solve another drawback of a traditional waveguide. At high SPL levels, the traditional waveguide has high levels of SPL in the throat of the waveguide that causes wave steepening—An actual 3rd order non-linear distortion of the wavefront as it moves through the waveguide. This has often been associated with a negative perception of some waveguide designs. The drivers 55-65 of the DPC waveguide 50 share the sound power and prevent the center tweeter from reaching the levels of SPL in the throat to cause this distortion becoming a factor. This helps to create sensitive 92 dB/2.93V/1 M for one tested tower speaker and the 89 dB/2.83V/1 M for another tested tower using the DPC waveguide 50. FIGS. 14 and 15 demonstrate the results of the DPC waveguide of the exact same waveguide with a single center tweeter (FIGS. 14A-14C) versus the complete DPC solution (FIGS. 15A-15C). FIG. 15 shows the directivity control over the prior art FIG. 14.

In one example operation, speaker 10 receives an electrical signal via the terminals 45. The electrical signal is provided to the speaker crossover 30, and more specifically, the main speaker crossover 35. The main speaker crossover 35 provides signals of varying frequency ranges, amplitudes, and/or phases to the woofer(s) 20, the midrange drivers 25, and the second speaker crossover 40. The second speaker crossover 40 then provides signals of varying frequency ranges, amplitudes, and/or phases to the drivers 55-65. Filtering and conditioning of the electrical signals occurs as part of the crossover processes.

Accordingly, the speaker disclosed herein provides a new and useful directivity pattern control (DPC) waveguide.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

What is claimed is:

1. A directivity pattern control (DPC) waveguide transducer for a speaker, the DPC waveguide having a major axis of propagation, the DPC waveguide transducer comprising:

a body comprising:

a first portion including a substantially flat surface in a first plane intersecting the major axis of propagation;

a second portion including a horn surface adjacent to the flat surface, the horn surface being contoured from a throat to a mouth in a substantially horn shape; and a tweeter aperture at least substantially formed by the first portion, the tweeter aperture being at least substantially in the first plane, and the throat being at least substantially in a second plane, the second plane intersecting the major axis of propagation and being offset from the first plane along the major axis of propagation;

a first tweeter coupled to the body substantially adjacent to the throat, the first tweeter to propagate a first sound radiation toward the throat, through the second portion, and exiting the mouth in vertical and horizontal directivities based on the horn surface; and a second tweeter coupled to the body substantially adjacent to the tweeter aperture, the second tweeter to propagate a second sound radiation toward the tweeter aperture and not being at least substantially controlled by the second portion, the second tweeter to support additional power handling to the first tweeter thereby increasing sensitivity and reducing compression for the DPC waveguide transducer, and the second tweeter being offset from the first tweeter, via the tweeter aperture and the throat, respectively, to allow for time alignment and further beamforming of the DPC waveguide transducer thereby increasing beamforming sensitivity.

2. The DPC waveguide transducer of claim 1, wherein the body includes a unitary, substantially-rigid body.

3. The DPC waveguide transducer of claim 1, wherein the first portion includes a discoid portion and wherein the second portion includes a waveguide portion contiguous with the discoid portion.

4. The DPC waveguide transducer of claim 1, wherein the first plane and the second plane intersecting the major axis of propagation are orthogonal to the major axis of propagation.

5. The DPC waveguide transducer of claim 1, wherein the throat is formed at a center of the second portion.

6. The DPC waveguide transducer of claim 1, wherein the second portion, at a plurality of planes orthogonal to the major axis of propagation, includes respective cross-sections of the horn surface being substantially oval, thereby limiting early reflections from two external surfaces from the DPC waveguide and reducing distortion.

7. The DPC waveguide transducer of claim 1, wherein the first tweeter radiates the first sound radiation at a first range of tweeter frequencies, wherein the second tweeter radiates the second sound radiation at a second range of tweeter frequencies, and wherein the second range of tweeter frequencies is a lesser range than the first range of tweeter frequencies.

8. The DPC waveguide transducer of claim 1, wherein the first tweeter includes a first full range tweeter having a first range of tweeter frequencies, wherein the second tweeter includes a midrange tweeter at a second range of tweeter frequencies less than the first range of tweeter frequencies.

9. The DPC waveguide transducer of claim 1, wherein the second plane is parallel to the first plane along the major axis of propagation.

10. The DPC waveguide transducer of claim 1, wherein the tweeter aperture includes a first respective portion in the first portion of the body and a second respective portion in the second portion of the body.

11. The DPC waveguide transducer of claim 10, further comprising a first driver cover having a first surface with a first plurality of apertures, the first surface comprising a first flat surface portion and a first contoured portion contiguous with the first flat surface portion.

12. The DPC waveguide transducer of claim 11, wherein the first flat surface portion of the first driver cover is in the first plane of the flat surface, and wherein the first contoured portion substantially follow the contour of the horn surface.

13. The DPC waveguide transducer of claim 1, further comprising:

a second tweeter aperture at least substantially formed by the first portion, the second tweeter aperture being at least substantially in the first plane, and the tweeter aperture, the second tweeter aperture, and the throat being in a linear arrangement along a diameter of the body; and a third tweeter coupled to the body and substantially adjacent to the second tweeter aperture, the third tweeter to propagate a third sound radiation toward the second tweeter aperture and not being at least substantially controlled by the second portion.

14. The DPC waveguide transducer of claim 13, wherein the third tweeter further supports additional power handling to the first tweeter thereby further increasing sensitivity and reducing compression for the DPC waveguide transducer, and wherein the third tweeter is offset from the first tweeter to allow for time alignment and further beamforming of the DPC waveguide transducer thereby further increasing beamforming sensitivity.

15. A loud speaker comprising:

a housing;

a mid-woofer supported by the housing; and the directivity pattern control (DPC) waveguide transducer of claim 1 supported to the housing.

16. The speaker of claim 15, further comprising a second mid-woofer supported by the housing, wherein the DPC waveguide transducer is disposed between the mid-woofer and the second mid-woofer, and wherein the DPC waveguide transducer has a different frequency range from the mid-woofer and the second mid-woofer.

17. The speaker of claim 16, further comprising a woofer supported by the housing.

* * * * *